(12) United States Patent
Banba et al.

(10) Patent No.: US 7,585,907 B2
(45) Date of Patent: Sep. 8, 2009

(54) INORGANIC POWDER-CONTAINING RESIN COMPOSITION, A FILM-FORMING MATERIAL LAYER, A TRANSFER SHEET, METHOD OF PRODUCING A SUBSTRATE HAVING A DIELECTRIC LAYER FORMED THEREON, AND A SUBSTRATE HAVING A DIELECTRIC LAYER FORMED THEREON

(75) Inventors: Tomohide Banba, Ibaraki (JP); Katsuya Kume, Ibaraki (JP); Makoto Kai, Ibaraki (JP); Natsuki Kobayashi, Ibaraki (JP); Mami Ikeya, Ibaraki (JP); Yasushi Buzoujima, Ibaraki (JP); Junichi Sekiya, Ibaraki (JP); Mitsuhiro Kanada, Ibaraki (JP)

(73) Assignee: Nitto Denko Corporation, Osaka (JP)

( * ) Notice: Subject to any disclaimer, the term of this patent is extended or adjusted under 35 U.S.C. 154(b) by 394 days.

(21) Appl. No.: 10/565,565

(22) PCT Filed: Jul. 23, 2004

(86) PCT No.: PCT/JP2004/010483

§ 371 (c)(1),
(2), (4) Date: Jan. 23, 2006

(87) PCT Pub. No.: WO2005/010092

PCT Pub. Date: Feb. 3, 2005

(65) Prior Publication Data

US 2006/0199883 A1    Sep. 7, 2006

(30) Foreign Application Priority Data

Jul. 24, 2003   (JP) ............................... 2003-279206

(51) Int. Cl.
*C08K 5/521* (2006.01)
(52) U.S. Cl. .................. 524/145; 524/140; 524/141
(58) Field of Classification Search ............. 524/140, 524/141
See application file for complete search history.

(56) References Cited

U.S. PATENT DOCUMENTS

| | | | |
|---|---|---|---|
| 4,557,856 A * | 12/1985 | Miyakawa et al. ........... 252/500 |
| 5,827,792 A * | 10/1998 | Fukuda et al. .............. 501/138 |
| 6,268,112 B1 * | 7/2001 | Satou ..................... 430/284.1 |
| 6,326,125 B1 * | 12/2001 | Kakinuma et al. ........ 430/281.1 |
| 6,455,218 B2 * | 9/2002 | Isonaka et al. .......... 430/111.35 |
| 7,057,631 B2 * | 6/2006 | Nakamura et al. .......... 347/115 |
| 2003/0108727 A1 | 6/2003 | Kosaka et al. |
| 2003/0175615 A1 * | 9/2003 | Miyake et al. ........... 430/270.1 |
| 2005/0106337 A1 | 5/2005 | Kosaka et al. |

FOREIGN PATENT DOCUMENTS

| | | |
|---|---|---|
| EP | 0 987 228 A2 | 3/2000 |
| EP | 1 063 247 A1 | 12/2000 |
| JP | 62-133425 | 6/1987 |
| JP | 3-189623 | 8/1991 |
| JP | 7-314918 | 12/1995 |
| JP | 9-102273 | 4/1997 |
| JP | 9-176471 | 7/1997 |
| JP | 11-35780 | 2/1999 |
| JP | 11-135008 | 5/1999 |
| JP | 11-260254 | 9/1999 |
| JP | 2000-53444 | 2/2000 |
| JP | 2000-272251 | 10/2000 |
| JP | 2000-319548 A | 11/2000 |
| JP | 2000-345081 | 12/2000 |
| JP | 2001-001653 | 1/2001 |
| JP | 2001-185024 A | 7/2001 |
| JP | 2001-243837 | 9/2001 |
| JP | 2002-25431 A | 1/2002 |
| JP | 2002-105112 A | 4/2002 |
| JP | 2002-179925 | 6/2002 |
| JP | 2003-089274 | 3/2003 |
| JP | 2004-115783 | 4/2004 |
| WO | WO00/40632 | 7/2000 |

(Continued)

OTHER PUBLICATIONS

Machine translation of JP 2002-105112.*

(Continued)

*Primary Examiner*—Marc S Zimmer
*Assistant Examiner*—John Uselding
(74) *Attorney, Agent, or Firm*—Knobbe Martens Olson & Bear LLP

(57) ABSTRACT

The invention provides an inorganic powder-containing resin composition capable of forming a dielectric layer having high light transmittance and excellent in surface smoothness. The invention also provides a film-forming material layer, a transfer sheet and a dielectric layer, which comprise the composition, a method of producing a substrate having a dielectric layer formed thereon, and a substrate having a dielectric layer formed thereon. The inorganic powder-containing resin composition comprises inorganic powder, a binder resin, and a phosphorus compound represented by formula (1):

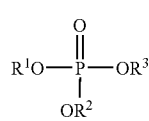

(1)

wherein $R^1$, $R^2$ and $R^3$ independently represent H, an alkyl group, an alkylaryl group, $NH_4^+$ (ammonium) or —$(CH_2CH_2O)_n$—$R^4$, wherein n is 1 to 15, and $R^4$ represents H, an alkyl group, an alkylaryl group or a (meth)acryloyl group.

14 Claims, No Drawings

FOREIGN PATENT DOCUMENTS

WO       WO00/42622     7/2000

OTHER PUBLICATIONS

Supplementary European Search Report issued on the corresponding European Patent Application No. 04770888.8, dated Nov. 3, 2006.

Official Bulletin as the Information Disclosure Statement issued on the corresponding Japanese Patent Application No. 2004-215523, dated Sep. 21, 2007.

* cited by examiner

INORGANIC POWDER-CONTAINING RESIN COMPOSITION, A FILM-FORMING MATERIAL LAYER, A TRANSFER SHEET, METHOD OF PRODUCING A SUBSTRATE HAVING A DIELECTRIC LAYER FORMED THEREON, AND A SUBSTRATE HAVING A DIELECTRIC LAYER FORMED THEREON This application is the U.S. National Phase under 35 U.S.C. §371 of International Application PCT/JP2004/010483, filed Jul. 23, 2004, which claims priority to Japanese Patent Application No. 2003-279206, filed Jul. 24, 2003. The International Application was not published under PCT Article 21(2) in English.

TECHNICAL FIELD

The present invention relates to an inorganic powder-containing resin composition, a film-forming material layer comprising the composition, a transfer sheet, a dielectric layer, a method of producing a substrate having a dielectric layer formed thereon, and a substrate having a dielectric layer formed thereon. In particular, the inorganic powder-containing resin composition of the present invention is useful as a material forming a dielectric layer in a plasma display panel.

BACKGROUND ART

As thin and flat large display in recent years, attention has been paid to a plasma display panel (referred to hereinafter a "PDP") together with a liquid crystal display. A part of PDP has a structure wherein a dielectric layer consisting of sintered glass is formed on the surface of a glass substrate having an electrode fixed therein.

A method of forming this dielectric layer wherein a paste composition containing glass powder, an acrylate-based resin and a solvent is applied onto a support film to form a film-forming material layer, then the film-forming material layer formed on the support film is transferred onto the surface of a glass substrate having an electrode fixed therein, and the transferred film-forming material layer is sintered to form a dielectric layer on the surface of the glass substrate is disclosed (see JP-A 9-102273 and JP-A 2001-185024).

As the dielectric layer-forming resin composition, a composition comprising 100 to 500 parts by weight of dielectric inorganic powder added to 100 parts by weight of a self-adhesive resin having a weight-average molecular weight of 20,000 to 1,000,000 and a glass transition temperature of 15° C. or less obtained by copolymerizing 80 to 100% by weight of $C_1$ to $C_{12}$ methacrylate with 0 to 20% by weight of another monomer copolymerizable therewith is disclosed (JP-A 11-35780 and International Patent Publication No. 00/42622).

A transfer sheet having at least a base film and a transfer layer arranged in a releasable manner on the base film, wherein the transfer layer comprises at least a glass frit-containing inorganic component and an organic component capable of removal upon sintering and has surface smoothness Ra in the range of 0.4 μm or less, is disclosed (JP-A 11-260254). It is described therein that the organic component can, if necessary, contain a transferability-conferring agent such as ortho-phosphates etc. and a dispersant and suspending agent such as a phosphate based-surfactant etc.

However, the conventional paste composition or dielectric layer-forming resin composition has a problem that in a step of sintering a transferred film-forming material layer to form a dielectric layer, the light transmittance of the dielectric layer is reduced due to bubbles occurring and remaining in a melted film-forming material layer. Particularly in sintering in the low-temperature range in which the corrosion of an electrode or the deformation of a substrate does not occur by heating, the bubbles occurring in the melted film-forming material layer are hardly removable, thus significantly reducing the light transmittance of the dielectric layer. The dielectric layer is required to have high surface smoothness for use in a display, but the conventional paste composition has high viscosity upon melting, and thus there is a problem that the traces of bubbles occurring in the melted film-forming material layer remain as such, to deteriorate the surface smoothness of the dielectric layer. In the dielectric layer formed on a front plate of PDP particularly required to have transparency, there is demand for solving the problems of light transmittance and surface smoothness.

It is described in JP-A 11-260254 supra that phosphates may be added if necessary for the purpose of improvement of the dispersibility and suspending ability of inorganic powder and improvement of transferability and composition flowability, but not added for the purpose of improvement of the light transmittance of the dielectric layer. Further, there is no description of a specific example showing the effect of phosphates added.

DISCLOSURE OF INVENTION

Problem to be Solved by the Invention

To solve the problem in the prior art described above, an object of the invention is to provide an inorganic powder-containing resin composition capable of forming a dielectric layer having high light transmittance and excellent in surface smoothness. Another object of the invention is to provide a film-forming material layer, a transfer sheet and a dielectric layer, which comprise the composition, a method of producing a substrate having a dielectric layer formed thereon, and a substrate having a dielectric layer formed thereon.

Means of Solving the Problem

The present inventors made extensive study for solving the problem described above, and as a result, they found that the above objects can be achieved by the following inorganic powder-containing resin composition, and the present invention was thereby arrived at.

That is, the present invention relates to an inorganic powder-containing resin composition comprising inorganic powder, a binder resin, and a phosphorus compound represented by formula (1):

(1)

wherein $R^1$, $R^2$ and $R^3$ independently represent H, an alkyl group, an alkylaryl group, $NH_4^+$ (ammonium) or $-(CH_2CH_2O)_n-R^4$, wherein n is 1 to 15, and $R^4$ represents H, an alkyl group, an alkylaryl group or a (meth)acryloyl group.

In the present invention, the specific phosphorus compound is added to the inorganic powder-containing resin composition thereby efficiently removing bubbles occurring upon melting and sintering of the film-forming material layer. Accordingly, the light transmittance of the dielectric layer formed after sintering can be improved without bubbles remaining therein. Further, the melting viscosity of the inorganic powder-containing resin composition of sintering can be reduced suitably by adding the specific phosphorus compound. Accordingly, the surface smoothness of the dielectric layer can be improved without the traces of bubbles in the melted film-forming material layer. The inorganic powder-containing resin composition of the present invention is used particularly preferably when the sintering step is carried out at a low-temperature range (650° C. or less).

In the present invention, the weight-average molecular weight of the binder resin is preferably 50,000 to 500,000. The binder resin is preferably (meth)acrylic resin. The (meth)acrylic resin preferably has a carboxyl group. Preferably the (meth)acrylic resin having a carboxyl group has an acid value of 0.5 to 5 KOH mg/g.

In the present invention, the inorganic powder-containing resin composition preferably comprises 5 to 50 parts by weight of the binder resin and 0.1 to 10 parts by weight of the phosphorus compound relative to 100 parts by weight of inorganic powder. The amount of the binder resin is more preferably 10 to 40 parts by weight, particularly preferably 15 to 30 parts by weight. The amount of the phosphorus compound is more preferably 0.2 to 6 parts by weight. When the amount of the binder resin is lower than 5 parts by weight, the inorganic powder-containing resin composition is hardly formed into a flexible sheet, while when the amount is higher than 50 parts by weight, the binder resin remains in the film-forming material layer after sintering, to easily deteriorate the optical quality of the dielectric layer. When the amount of the phosphorous compound is lower than 0.1 part by weight, bubbles occurring in the film-forming material layer upon melting and sintering cannot be sufficiently removed, thus easily reducing the light transmittance of the dielectric layer. Further, the traces of bubbles remain in the melted film-forming material layer to easily deteriorate the surface smoothness of the dielectric layer. On the other hand, when the amount is higher than 10 parts by weight, the phosphorus compound remains in the dielectric layer after sintering to easily deteriorate the optical quality. The light transmittance (total light transmittance) of the dielectric layer-forming substrate having a dielectric layer formed on a substrate is preferably 80% or more. When the transmittance is less than 80%, the visibility of the resulting PDP panel may be problematic. By adding the phosphorus compound in the compounding amount described above, the light transmittance can be regulated to be 80% or more.

In the present invention, the inorganic powder is preferably glass powder.

In the present invention, the viscosity of the inorganic powder at 600° C. is preferably 150 Pa·s or less, more preferably 20 to 140 Pa·s. When the viscosity at 600° C. is higher than 150 Pa·s, bubbles may be effectively removed by adding the phosphorus compound, but the traces of bubbles remain to easily deteriorate the surface smoothness of the dielectric layer.

The inorganic powder-containing resin composition is useful particularly as a dielectric layer-forming material.

Further, the present invention relates to a film-forming material layer comprising the inorganic powder-containing resin composition formed in a sheet form.

Further, the present invention relates to a transfer sheet comprising at least the film-forming material layer laminated on a support film.

The dielectric layer of the present invention comprises the film-forming material layer sintered therein.

Further, the present invention relates to a method of producing a substrate having a dielectric layer formed thereon, which comprises the step of transferring a film-forming material layer of the transfer sheet onto a substrate and the step of sintering the transferred film-forming material layer at 550 to 650° C. to form a dielectric layer on the substrate, as well as a substrate having a dielectric layer formed thereon produced by the method.

BEST MODE FOR CARRYING OUT THE INVENTION

Hereinafter, the present invention is described in detail.

The inorganic powder-containing resin composition of the present invention comprises inorganic powder, a binder resin, and a phosphorus compound represented by formula (1) above.

The inorganic powder may be any known one and can be used without particular limitation. Specific examples include silicon oxide, titanium oxide, aluminum oxide, calcium oxide, boron oxide, zinc oxide, glass powder etc. The average particle diameter of the inorganic powder is preferably 0.1 to 10 μm.

In the present invention, glass powder is preferably used as the inorganic powder. The glass powder may be any known one and can be used without particular limitation. Examples of the powder include 1) a mixture of zinc oxide, boron oxide and silicon oxide ($ZnO$—$B_2O_3$—$SiO_2$ system), 2) a mixture of zinc oxide, boron oxide, silicon oxide and aluminum oxide ($ZnO$—$B_2O_3$—$SiO_2$—$Al_2O_3$ system), 3) a mixture of lead oxide, boron oxide, silicon oxide and calcium oxide ($PbO$—$B_2O_3$—$SiO_2$—$CaO$ system), 4) a mixture of lead oxide, boron oxide, silicon oxide and aluminum oxide ($PbO$—$B_2O_3$—$SiO_2$—$Al_2O_3$ system), 5) a mixture of lead oxide, zinc oxide, boron oxide and silicon oxide ($PbO$—$ZnO$—$B_2O_3$—$SiO_2$ system), and 6) a mixture of lead oxide, zinc oxide, boron oxide, silicon oxide and aluminum oxide ($PbO$—$ZnO$—$B_2O_3$—$SiO_2$—$Al_2O_3$ system). If necessary, these inorganic powders may contain $CaO$, $BaO$, $Bi_2O_3$, $SrO$, $TiO_2$, $CuO$ or $In_2O_3$. In consideration of the formation of a dielectric layer by sintering treatment, the inorganic powder is more preferably glass powder having a softening point of 400 to 650° C.

The binder resin is not particularly limited, and any known binder resin can be used, but (meth)acrylic resin is preferable, and (meth)acrylic resin having a carboxyl group is particularly preferably used. A carboxyl group can be introduced into (meth)acrylic resin to improve the surface smoothness of the dielectric layer after sintering. Generally, the surface smoothness of the dielectric layer is changed depending on the size of a panel to be sintered, and tends to be deteriorated as the panel is large-sized, but by introducing a carboxyl group into the (meth)acrylic resin, excellent surface smoothness can be maintained even if the panel size is increased. Further, the carboxyl group can bring about suitable interaction with the inorganic powder to improve the cohesiveness of the transfer sheet having a film-forming material layer formed thereon, thus increasing the strength of the transfer sheet to facilitate transfer operation. Further, the film-forming material layer using the (meth)acrylic resin having a carboxyl group has improved adhesion upon transfer onto a glass substrate. Release attributable to insufficient adhesion after transfer, and shape defect of topically thinned circular regions without forming a uniform layer after sintering, can thereby be prevented.

The weight-average molecular weight of the binder resin such as (meth)acrylic resin is preferably 50,000 to 500,000, more preferably 50,000 to 300,000. When the weight-average molecular weight is lower than 50,000, the transfer sheet having a film-forming material layer thereon, prepared by applying the inorganic powder-containing resin composition onto a support film, is poor in cohesive force to reduce the strength of the transfer sheet, which is not preferable for operativeness thereafter. On the other hand, a molecular of higher than 500,000 is not preferable either because the viscosity of the inorganic powder-containing resin composition is increased to deteriorate the dispersibility of the inorganic powder.

The (meth)acrylic resin is a polymer of acrylic monomer and/or methacrylic monomer, or a mixture thereof. Preferably, a monomer containing a carboxyl group is copolymerized with the above monomer to form (meth)acrylic resin containing a carboxyl group.

Examples of the (meth)acrylic monomer include alkyl (meth)acrylates such as methyl(meth)acrylate, ethyl(meth)acrylate, propyl(meth)acrylate, isopropyl(meth)acrylate, butyl(meth)acrylate, isobutyl(meth)acrylate, t-butyl(meth)acrylate, pentyl(meth)acrylate, amyl(meth)acrylate, isoamyl(meth)acrylate, hexyl(meth)acrylate, heptyl(meth)acrylate, octyl(meth)acrylate, isooctyl(meth)acrylate, ethylhexyl(meth)acrylate, nonyl(meth)acrylate, decyl(meth)acrylate, isodecyl(meth)acrylate, undecyl(meth)acrylate, dodecyl(meth)acrylate, lauryl(meth)acrylate, stearyl(meth)acrylate and isostearyl(meth)acrylate, and aryl(meth)acrylates such as phenyl(meth)acrylate and tolyl(meth)acrylate. These monomers may be used singly or as a mixture of two or more thereof.

Examples of the monomer containing a carboxyl group include (meth)acrylic acid, 2-methyl cis(meth)acrylic acid, allylacetic acid, crotonic acid, maleic acid, methylmaleic acid, fumaric acid, methylfumaric acid, dimethylfumaric acid, itaconic acid and vinylacetic acid. These monomers may be used singly or as a mixture of two or more thereof.

Preferably, the (meth)acrylic resin contains the carboxyl-containing monomer in an amount of 0.1 to 10 mol %. When the amount of the carboxyl-containing monomer is lower than 0.1 mol %, sufficient interaction with the inorganic powder cannot be achieved, and thus the resulting transfer sheet having a film-forming material layer formed thereon is poor in cohesive strength to reduce the strength of the transfer sheet, while when the amount is higher than 10 mol %, the interaction with the inorganic powder is too high, and thus the (meth)acrylic resin is hardly decomposed and removed upon sintering, thus easily deteriorating the optical quality of the dielectric layer.

The content of carboxyl group is particularly preferably in such a range that the acid value of (meth)acrylic resin is 0.5 to 5 KOH mg/g. When the acid value is less than 0.5 KOH mg/g, there is a tendency that interaction with the inorganic powder and the cohesive force of the binder resin itself are low, and the film-forming material layer not only becomes poor in cohesive force to deteriorate operativeness but also becomes inferior in adhesiveness upon transfer onto a glass substrate to generate release attributable to insufficient adhesiveness after transfer. In addition, the effect of improving the dispersibility of inorganic powder tends to be not sufficiently achieved. On the other hand, when the acid value is higher than 5 KOH mg/g, the interaction between the inorganic powder and the binder resin becomes too high, and the binder resin is agglomerated by strongly adhering to the surface of the inorganic powder. As a result, the inorganic powder-containing resin composition tends to become highly viscous so that the film-forming material layer is hardly formed with good smoothness, and the binder resin adhering strongly to the surface of the inorganic powder is hardly decomposed and removed upon sintering treatment, to deteriorate the optical properties (light transmittance etc.) and surface smoothness of the dielectric layer after sintering.

The (meth)acrylic resin is added in an amount of preferably 5 to 50 parts by weight, more preferably 10 to 40 parts by weight, still more preferably 15 to 30 parts by weight, relative to 100 parts by weight of the inorganic powder.

The glass transition temperature of the (meth)acrylic resin is preferably 30° C. or less, more preferably 20° C. or less. A glass transition temperature of higher than 30° C. is not preferable because the resulting transfer sheet is not flexible, thus deteriorating transferability, handling properties and the ability of the sheet to be contour along an uneven surface. The glass transition temperature of the (meth)acrylic resin can be regulated in the above range by suitably changing the compounding ratio of copolymers used.

In the phosphorus compound represented by the formula (1) above, $R^1$, $R^2$ and $R^3$ independently represent H, an alkyl group, an alkylaryl group, $NH_4^+$ (ammonium) or $-(CH_2CH_2O)_n-R^4$, wherein n is 1 to 15, and $R^4$ represents H, an alkyl group, an alkylaryl group or a (meth)acryloyl group. n is preferably 1 to 10.

Specific examples of the alkyl group include a methyl group, ethyl group, propyl group, butyl group, octyl group, isooctyl group, ethylhexyl group, nonyl group, decyl group, isodecyl group, undecyl group, dodecyl group, lauryl group, stearyl group and isostearyl group.

Specific examples of the alkylaryl group include a methylphenyl group, ethylphenyl group, butylphenyl group, dibutylphenyl group, octylphenyl group, nonylphenyl group, dinonylphenyl group, ethylnaphthyl group, butylnaphthyl group and octylnaphthyl group.

Examples of the phosphorus compound includes phosphoric acid, ammonium phosphate, monopropyl phosphate, monobutyl phosphate, dibutyl phosphate, tributyl phosphate, di-2-ethylhexyl phosphate, monobutylphenyl phosphate, dioctylphenyl phosphate, monoethoxyethyl phosphate, dibutoxyethyl phosphate, mono-2-(meth)acryloyloxyethyl phosphate, phosphoric acid polyethylene glycol mono(meth)acrylate, polyoxyethylene nonyl phenyl ether phosphoric acid, and polyoxyethylene lauryl ether phosphoric acid.

The phosphorus compound is added in an amount of preferably 0.1 to 10 parts by weight, more preferably 0.2 to 6 parts by weight, relative to 100 parts by weight of the inorganic powder.

When the inorganic powder-containing resin composition is applied onto a support film to form a transfer sheet having a film-forming material layer formed thereon, a solvent is added preferably to the composition such that the composition can be uniformly applied onto the support film.

The solvent is not particularly limited insofar as it is highly compatible with the inorganic powder and highly solubilizes the binder resin. Examples of the solvent include terpineol, dihydro-α-terpineol, dihydro-α-terpinyl acetate, butyl carbitol acetate, butyl carbitol, isopropyl alcohol, benzyl alcohol, turpentine oil, diethyl ketone, methyl butyl ketone, dipropyl ketone, cyclohexanone, n-pentanol, 4-methyl-2-pentanol, cyclohexanol, diacetone alcohol, ethylene glycol monomethyl ether, ethylene glycol monoethyl ether, ethylene glycol monobutyl ether, diethylene glycol monomethyl ether, diethylene glycol monoethyl ether, diethylene glycol monobutyl ether, propylene glycol monomethyl ether, propylene glycol monoethyl ether, n-butyl acetate, amyl acetate, methyl cellosolve acetate, ethyl cellosolve acetate, propylene glycol monomethyl ether acetate, ethyl-3-ethoxy propionate, 2,2,4-trimethyl-1,3-pentanediol-1-isobutyrate, and 2,2,4-trimethyl-1,3-pentanediol-3-isobutyrate. These solvents may be used singly or as a mixture of two or more thereof in an arbitrary ratio.

The amount of the solvent to be added is preferably 10 to 100 parts by weight relative to 100 parts by weight of the inorganic powder.

A plasticizer may be added to the inorganic powder-containing resin composition of the present invention. By adding the plasticizer, the inorganic powder-containing resin composition can be applied onto a support film to regulate the pliability and flexibility of a transfer sheet having a film-forming material layer formed thereon and the transferability of the film-forming material layer onto a substrate.

As the plasticizer, any known plasticizer can be used without particular limitation. Mention can be made of plasticizers for example adipic acid derivatives such as diisononyl adipate, di-2-ethylhexyl adipate and dibutyl diglycol adipate, azelaic acid derivatives such as di-2-ethylhexyl azelate, sebacic acid derivatives such as di-2-ethylhexyl sebacate, trimellitic acid derivatives such as tri(2-ethylhexyl)trimellitate, triisononyl trimellitate and triisodecyl trimellitate, pyromellitic acid derivatives such as tetra-(2-ethylhexyl) pyromellitate, oleic acid derivatives such as propylene glycol monooleate, and glycol derivatives such as polyethylene glycol and polypropylene glycol.

The amount of the plasticizer to be added is preferably not higher than 20 parts by weight relative to 100 parts by weight of the inorganic powder. It is not preferable that the amount of the plasticizer to be added is higher than 20 parts by weight, because the strength of the resulting transfer sheet is lowered.

In addition to the components described above, various additives such as a dispersant, a silane coupling agent, a tackifier, a leveling agent, a stabilizer and a defoaming agent may be added to the inorganic powder-containing resin composition.

The transfer sheet of the present invention is composed of a support film and at least a film-forming material layer formed on the support film, and used in whole transfer of the film-forming material layer formed on the support film onto the surface of a substrate.

The transfer sheet is produced by applying the inorganic powder-containing resin composition onto a support film and drying it to remove the solvent to form a film-forming material layer.

The support film constituting the transfer sheet is preferably a resin film having not only heat resistance and solvent resistance but also flexibility. The support film has flexibility so that the inorganic powder-containing resin composition in a paste form can be applied onto it by such as a roll coater and the film-forming material layer can be stored and supplied in a rolled state.

The resin forming the support film includes, for example, polyethylene terephthalate, polyester, polyethylene, polypropylene, polystyrene, polyimide, polyvinyl alcohol, polyvinyl chloride and fluorine-containing resin such as polyfluoroethylene, as well as nylon and cellulose.

The thickness of the support film is not particularly limited, but is preferably about 25 to 100 µm.

The surface of the support film is subjected preferably to release treatment. The procedure of releasing the support film can thereby be facilitated in the step of transferring the film-forming material layer onto a substrate.

The method which can be used to apply the inorganic powder-containing resin composition onto the support film includes, for example, coating methods with roll coaters such as gravure, kiss and comma, die coaters such as slot and fountain, and squeeze coater, curtain coater etc., but any methods can be used insofar as a uniform film can be formed on the support film.

The thickness of the film-forming material layer is varied depending on the content of inorganic powder, the type and size of panel, etc., but is preferably 10 to 200 µm, more preferably 30 to 100 µm. When the thickness is less than 10 µm, the thickness of the finally formed dielectric layer is insufficient, thus making it difficult to achieve desired dielectric properties. Usually, when the thickness is 30 to 100 µm, the required thickness of the dielectric layer in a large panel can be sufficiently secured. The thickness of the layer is preferably uniform, and the tolerance of the thickness is preferably within ±5%.

The transfer sheet may be provided with a protective film on the surface of the film-forming material layer. The material forming the protective film includes, for example, polyethylene terephthalate, polyester, polyethylene, polypropylene etc. The transfer sheet covered with the protective film can be stored and supplied in a rolled state. The surface of the protective film is subjected preferably to release treatment.

The method of producing a substrate having a dielectric layer formed thereon according to the present invention comprises the step of transferring a film-forming material layer of the transfer sheet onto a substrate and the step of sintering the transferred film-forming material layer at 550 to 650° C., preferably 550 to 600° C., to form a dielectric layer on the substrate.

The substrate includes ceramic or metallic substrates, and particularly when PDP is produced, a glass substrate having a suitable electrode fixed therein is used.

One example of the transfer step is shown below, but the method is not particularly limited insofar as the film-forming material layer can be transferred onto, and stuck fast to, the surface of a substrate.

After the protective film used if necessary on the transfer sheet is released, the transfer sheet is laminated on the surface of a glass substrate having an electrode fixed therein such that the surface of the film-forming material layer is abutted onto the surface of the glass substrate, and the transfer sheet is contact-bonded to the glass substrate by hot pressing with a heating roll laminator, and then the support film is released and removed from the film-forming material layer. The film-forming material layer is thereby transferred on, and stuck fast to, the surface of the glass substrate.

The transfer conditions are selected such that for example, the surface temperature of the laminator is 25 to 100° C., the linear pressure of the roll is 0.5 to 15 kg/cm, the rate of travel is 0.1 to 5 m/min., but the transfer conditions are not limited thereto. The glass substrate may be pre-heated, and the pre-heating temperature is about 50 to 100° C.

One example of the step of sintering the film-forming material layer is shown below, but the method is not particularly limited insofar as the dielectric layer can be formed on the substrate by sintering the film-forming material layer at 550 to 650° C.

The glass substrate having the film-forming material layer formed thereon is placed in an atmosphere at a high temperature of 550 to 650° C., whereby the organic materials (binder resin, residual solvent, various additives etc.) in the film-forming material layer are decomposed and removed, and the inorganic powder (glass powder) is melted and sintered. A dielectric layer consisting of an inorganic sintered product (sintered glass) is formed on the glass substrate, to form a substrate having a dielectric layer formed thereon.

The thickness of the dielectric layer, though being varied depending on the thickness of the film-forming material layer used, is about 15 to 50 μm.

The substrate having a dielectric layer formed thereon according to the present invention is free of fine voids or cracks on the dielectric layer, has high surface smoothness and is excellent in optical quality such as light transmittance. The dielectric layer formed from the inorganic powder-containing resin composition of the present invention is highly transparent and can be preferably used in forming a dielectric layer arranged particularly on a front plate of PDP.

EXAMPLES

Hereinafter, the present invention is described in more detail by reference to the Examples, but the present invention is not limited thereto.

(Measurement of Weight-average Molecular Weight)

The weight-average molecular weight of the prepared polymer was determined by GPC (gel permeation chromatography) and converted using polystyrene standards.

GPC unit: HLC-8220 GPC manufactured by Tosoh Corporation

Columns: TSK gel Super HZM-H, H-RC and HZ-H columns manufactured by Tosoh Corporation Flow rate: 0.6 ml/min.

Concentration: 0.2 wt %

Injection volume: 20 μl

Column temperature: 40° C.

Eluate: THF (Measurement of Glass Transition Temperature)

A prepared polymer which was formed to have a thickness of 1 mm and cut out to have a size of φ8 mm was used to measure the temperature dependence of loss modulus G" at a frequency of 1 Hz by a dynamic viscoelasticity measuring unit (manufactured by Rheometrics). The peak top temperature in a curve of loss modulus G" measured was regarded as glass transition temperature Tg.

(Measurement of Acid Value)

The acid value of the prepared polymer was measured by an automatic titration apparatus (COM-550, manufactured by Hiranuma Sangyo Co., Ltd.) and determined according to the following equation:

$$A=\{(Y-X)\times f\times 5.611\}/M$$

A: acid value

Y: amount (ml) of a sample solution used in titration

X: amount (ml) of 50 g sample-free mixed solvent used in titration f: factor of a titration solution M: weight (g) of a polymer sample The measurement conditions are as follows.

Sample solution: About 0.5 g polymer sample was dissolved in 50 g mixed solvent (weight ratio: toluene/2-propanol/distilled water=50/49.5/0.5) to prepare a sample solution.

Titration solution: A solution of potassium hydroxide in 2-propanol (0.1 N, manufactured by Wako Pure Chemical Industries, Ltd., for neutralization value test of petroleum products)

Electrodes: glass electrode, GE-101; comparative electrode, RE-201

Measurement mode: Petroleum product neutralization value test 1

(Measurement of Melt Viscosity of Inorganic Powder)

The melt viscosity of the inorganic powder used was measured at 600° C. The measuring unit used was a glass viscosity measuring unit (parallel plate deformation/rotaviscometer). In the measurement method, the inorganic powder was first melted at 1000° C., then introduced into a platinum cylindrical container and cooled to form a cylinder. This product was sandwiched between parallel disks of φ30 mm, heated at 600° C. and measured for its viscosity in a disk gap of 1.3 mm at a revolution number of 60 rpm.

(Measurement of Light Transmittance of Dielectric Layer)

The light transmittance (%) of the resulting dielectric layer was measured. As the light transmittance, the whole-light transmittance was measured by a haze meter (HM-150 manufactured by Murakami Color Research Laboratory).

(Evaluation of Surface Smoothness)

The surface roughness (height of a surface asperity: Rt) of the resulting dielectric layer was measured. After the incline of the dielectric layer was corrected, the height of the asperity (Rt) of the dielectric layer was determined by a contact type surface measuring unit (P-11 manufactured by KLA-Tencor Corporation).

Example 1

[Preparation of (meth)acrylic Resin]

A four-necked flask equipped with a stirring blade, a thermometer, a nitrogen gas inlet tube, a condenser and a dropping funnel was charged with 2-ethylhexyl methacrylate (2-EHMA), 2-methacryloxyethyl succinic acid (Light Ester HOMS, manufactured by Kyoeisha Chemical Co., Ltd.) (ratio by weight: 2-EHMA/Light Ester HOMS=99/1), a polymerization initiator and toluene, and a nitrogen gas was introduced into the mixture under gentle stirring, and the mixture was subjected to polymerization reaction for about 8 hours while the temperature of the solution in the flask was kept at about 75° C., to prepare a methacrylic resin solution having a solids content of 50% by weight. The weight-average molecular weight of the resulting methacrylic resin (A) was 100,000, and the glass transition temperature was −10° C., the acid value was 2.4 KOHmg/g.

[Preparation of an Inorganic Powder-containing Resin Composition]

As an inorganic powder, 100 parts by weight of PbO—$B_2O_3$—$SiO_2$—ZnO—$Al_2O_3$-based glass powder (glass transition point, 420° C.; softening point, 480° C.), 16 parts by weight of the methacrylic resin (A), 40 parts by weight of α-terpineol as solvent, 3 parts by weight of a phosphate compound represented by the formula (1) above wherein $R^1$=H, $R^2$=—$(CH_2CH_2O)_8$—$R^4$, $R^3$=H or —$(CH_2CH_2O)_6$—$R^4$, $R^4$=nonyl phenyl (Pliserf A212E, manufactured by Daiichi Kogyo Seiyaku Co., Ltd.), and 3 parts by weight of trioctyl trimellitate as plasticizer were compounded, mixed and dispersed with a dispersing machine to prepare an inorganic powder-containing resin composition (a) in a paste form.

[Preparation of Transfer Sheet]

A support film obtained by treating a polyethylene terephthalate (PET) film with a releasing agent was coated by a roll coater with the inorganic powder-containing resin composition (a) prepared above, and the coating film was dried at 150° C. for 5 minutes to remove the solvent, to form a film-forming material layer (thickness: 68 μm). Thereafter, the film-forming material layer was covered with a protective film (PET) and then rolled to prepare a transfer sheet.

[Preparation of Glass Substrate Having a Dielectric Layer Formed Thereon]

The protective film on the transfer sheet was released, and the surface of the film-forming material layer of the transfer sheet was abutted and laminated on the surface (surface having a bath electrode fixed therein) of a glass substrate for panel, and contact-bonded to the glass substrate by hot pressing with a heating roll laminator. In this contact-bonding, the surface temperature of the heating roll was 80° C., the linear pressure of the roll was 1 kg/cm, and the speed of travel of the roll was 1 m/min. When the support film was released and removed from the film-forming material layer after the hot contact-bonding treatment, the film-forming material layer had been transferred on, and stuck fast to, the surface of the glass substrate. The glass substrate having the film-forming material layer transferred thereon was placed in a sintering furnace, and the temperature in the furnace was increased from room temperature to 590° C. at an increasing rate of 10° C./min. and then maintained at a temperature of 590° C. for 60 minutes, whereby a dielectric layer made of sintered glass was formed on the surface of the glass substrate to produce a glass substrate having a dielectric layer formed thereon.

Example 2

[Preparation of (meth)acrylic Resin]

Methacrylic resin (A) was prepared in the same manner as in Example 1.

[Preparation of Inorganic Powder-containing Resin Composition]

Inorganic powder-containing resin composition (b) was prepared in the same manner as in Example 1 except that 0.7 part of a phosphorus compound (phosphoric acid) wherein $R^1$=H, $R^2$=H, $R^3$=H was used in place of the phosphorus compound in Example 1.

[Preparation of Transfer Sheet] and [Preparation of Glass Substrate Having a Dielectric Layer Formed Thereon]

A transfer sheet and a glass substrate having a dielectric layer formed thereon were prepared in the same manner as in Example 1 except that the inorganic powder-containing resin composition (b) was used in place of the inorganic powder-containing resin composition (a).

Example 3

[Preparation of (meth)acrylic Resin]

Methacrylic resin (A) was prepared in the same manner as in Example 1.

[Preparation of Inorganic Powder-containing Resin Composition]

Inorganic powder-containing resin composition (c) was prepared in the same manner as in Example 1 except that 1 part of a phosphorus compound (di-2-ethylhexyl phosphate) wherein $R^1$=H, $R^2$=$C_8H_{17}$, $R^3$=$C_8H_{17}$ was used in place of the phosphorus compound in Example 1.

[Preparation of Transfer Sheet] and [Preparation of Glass Substrate Having a Dielectric Layer Formed Thereon]

A transfer sheet and a glass substrate having a dielectric layer formed thereon were prepared in the same manner as in Example 1 except that the inorganic powder-containing resin composition (c) was used in place of the inorganic powder-containing resin composition (a).

Comparative Example 1

[Preparation of (meth)acrylic Resin]

Methacrylic resin (A) was prepared in the same manner as in Example 1.

[Preparation of Inorganic Powder-containing Resin Composition]

Inorganic powder-containing resin composition (d) was prepared in the same manner as in Example 1 except that the phosphorus compound was not used.

[Preparation of Transfer Sheet] and [Preparation of Glass Substrate Having a Dielectric Layer Formed Thereon]

A transfer sheet and a glass substrate having a dielectric layer formed thereon were prepared in the same manner as in Example 1 except that the inorganic powder-containing resin composition (d) was used in place of the inorganic powder-containing resin composition (a).

Comparative Example 2

[Preparation of (meth)acrylic Resin]

A four-necked flask equipped with a stirring blade, a thermometer, a nitrogen gas inlet tube, a condenser and a dropping funnel was charged with 2-ethylhexyl methacrylate (2-EHMA), 2-hydroxypropyl methacrylate (HPMA) (ratio by weight: 2-EHMA/HPMA=99/1), a polymerization initiator and toluene, and a nitrogen gas was introduced into the mixture under gentle stirring, and the mixture was subjected to polymerization reaction for about 8 hours while the temperature of the solution in the flask was kept at about 75° C., to prepare a methacrylic resin solution having a solids content of 40% by weight. The weight-average molecular weight of the resulting methacrylic resin (B) was 100,000, and the glass transition temperature was −10° C.

[Preparation of Inorganic Powder-containing Resin Composition]

Inorganic powder-containing resin composition (e) was prepared in the same manner as in Example 1 except that the methacrylic resin (B) was used in place of the methacrylic resin (A), and the phosphorus compound was not used.

[Preparation of Transfer Sheet] and [Preparation of Glass Substrate Having a Dielectric Layer Formed Thereon]

A transfer sheet and a glass substrate having a dielectric layer formed thereon were prepared in the same manner as in Example 1 except that the inorganic powder-containing resin composition (e) was used in place of the inorganic powder-containing resin composition (a).

Reference Example 1

[Preparation of (meth)acrylic Resin]

A four-necked flask equipped with a stirring blade, a thermometer, a nitrogen gas inlet tube, a condenser and a dropping funnel was charged with 2-ethylhexyl methacrylate (2-EHMA), n-butyl methacrylate (BMA) and acrylic acid (ratio by weight: 2-EHMA/BMA/acrylic acid=20/80/1), a polymerization initiator and toluene, and a nitrogen gas was introduced into the mixture under gentle stirring, and the mixture was subjected to polymerization reaction for about 8 hours while the temperature of the solution in the flask was kept at about 75° C., to prepare a methacrylic resin solution having a solids content of 50% by weight. The weight-average molecular weight of the resulting methacrylic resin (C) was 140,000, the glass transition temperature was 14° C., and the acid value was 7.7 KOH mg/g.

[Preparation of Inorganic Powder-containing Resin Composition]

Inorganic powder-containing resin composition (f) was prepared in the same manner as in Example 1 except that 33 parts by weight of the methacrylic resin (C) were used in place of 16 parts by weight of the methacrylic resin (A).

[Preparation of Transfer Sheet] and [Preparation of Glass Substrate Having a Dielectric Layer Formed Thereon]

A transfer sheet and a glass substrate having a dielectric layer formed thereon were prepared in the same manner as in Example 1 except that the inorganic powder-containing resin composition (f) was used in place of the inorganic powder-containing resin composition (a).

Reference Example 2

[Preparation of (meth)acrylic Resin]

A four-necked flask equipped with a stirring blade, a thermometer, a nitrogen gas inlet tube, a condenser and a dropping funnel was charged with n-butyl methacrylate, a polymerization initiator and toluene, and a nitrogen gas was introduced into the mixture under gentle stirring, and the mixture was subjected to polymerization reaction for about 8 hours while the temperature of the solution in the flask was kept at about 75° C., to prepare a methacrylic resin solution having a solids content of 50% by weight. The weight-average molecular weight of the resulting methacrylic resin (D) was 100,000, and the glass transition temperature was 20° C.

[Preparation of Inorganic Powder-containing Resin Composition]

Inorganic powder-containing resin composition (g) was prepared in the same manner as in Example 1 except that the methacrylic resin (D) was used in place of the methacrylic resin (A).

[Preparation of Transfer Sheet] and [Preparation of Glass Substrate Having a Dielectric Layer Formed Thereon]

A transfer sheet was prepared in the same manner as in Example 1 except that the inorganic powder-containing resin composition (g) was used in place of the inorganic powder-containing resin composition (a). The protective film on the transfer sheet prepared was released, and the surface of the film-forming material layer of the transfer sheet was abutted and laminated on the surface (surface having a bath electrode fixed therein) of a glass substrate for panel, and contact-bonded to the glass substrate by hot pressing with a heating roll laminator. In this contact-bonding, the surface temperature of the heating roll was 80° C., the linear pressure of the roll was 1 kg/cm, and the speed of travel of the roll was 1 m/min. When the support film was released and removed from the film-forming material layer after the hot contact-bonding treatment, release due to insufficient adhesion had been generated because of the low adhesion of the film-forming material layer to the glass substrate. Thereafter, the glass substrate having a dielectric layer formed thereon was prepared in the same manner as in Example 1. However, release of the dielectric layer had been generated and the product was not good as a product.

Reference Example 3

[Preparation of (meth)acrylic Resin]

Methacrylic resin (B) was prepared in the same manner as in Comparative Example 2.

[Preparation of Inorganic Powder-containing Resin Composition]

Inorganic powder-containing resin composition (h) was prepared in the same manner as in Example 1 except that the methacrylic resin (B) was used in place of the methacrylic resin (A).

[Preparation of Transfer Sheet] and [Preparation of Glass Substrate Having a Dielectric Layer Formed Thereon]

A transfer sheet and a glass substrate having a dielectric layer formed thereon were prepared in the same manner as in Example 1 except that the inorganic powder-containing resin composition (h) was used in place of the inorganic powder-containing resin composition (a).

TABLE 1

| | Viscosity (Pa·s) | Light transmittance (%) | Surface roughness Rt (μm) |
|---|---|---|---|
| Example 1 | 95 | 82.4 | 0.4 |
| Example 2 | 95 | 82.7 | 0.4 |
| Example 3 | 95 | 81.9 | 0.4 |
| Comparative Example 1 | 95 | 78.5 | 0.3 |
| Comparative Example 2 | 95 | 79.7 | 0.4 |
| Reference Example 1 | 95 | 82.3 | 0.7 |
| Reference Example 2 | 95 | 81.3 | 0.7 |
| Reference Example 3 | 95 | 80.1 | 2.4 |

As is evident from the results in Table 1, each of the inorganic powder-containing resin compositions to which a specific phosphorus compound had been added (Examples 1 to 3) formed a dielectric layer having higher light transmittance and more excellent surface smoothness than by the resin compositions to which no phosphorus compound had been added (Comparative Examples 1 and 2). Further, any dielectric layers obtained in Examples 1 to 3 were transparent. When (meth)acrylic resin having no carboxyl group was used, release due to insufficient adhesion was generated because of the low adhesion of the film-forming material layer to a glass substrate (Reference Example 2). In Reference Example 3, the light transmittance of the dielectric layer is high because bubbles generated during melting and sintering of the film-forming material layer can be removed without bubbles remaining therein by adding the phosphorus compound. However, the (meth)acrylic resin having a hydroxyl group is used, and thus there remain traces of bubbles remaining on the surface of the melted film-forming material layer, which would result in deterioration of the surface smoothness of the dielectric layer.

INDUSTRIAL APPLICABILITY

The inorganic powder-containing resin composition of the present invention can form a dielectric layer having high light transmittance and excellent in surface smoothness, and is useful as a material forming a dielectric. layer particularly in a plasma display panel.

The invention claimed is:

1. A dielectric inorganic powder-containing resin composition comprising inorganic powder, a binder resin, and a phosphorus compound represented by formula (1):

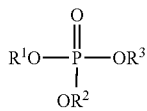

wherein $R^1$, $R^2$ and $R^3$ independently represent H, an alkyl group, an alkylaryl group or $-(CH_2CH_2O)_n-R^4$, wherein n is 1 to 15, and $R^4$ represents H, an alkyl group, an alkylaryl group or a (meth)acryloyl group, and
wherein the binder resin is (meth)acrylic resin,
wherein the (meth)acrylic resin has a carboxyl group and has an acid value of 0.5 to 5 KOH mg/g.

2. The inorganic powder-containing resin composition according to claim 1, wherein the weight-average molecular weight of the binder resin is 50,000 to 500,000.

3. The inorganic powder-containing resin composition according to claim 1, wherein 5 to 50 parts by weight of the binder resin and 0.1 to 10 parts by weight of the phosphorus compound relative to 100 parts by weight of the inorganic powder are contained.

4. The inorganic powder-containing resin composition according to claim 1, wherein the inorganic powder is glass powder.

5. The inorganic powder-containing resin composition according to claim 1, wherein the viscosity of the inorganic powder at 600° C. is 150 Pa·s or less.

6. A film-forming material layer comprising the inorganic powder-containing resin composition according to claim 1 formed in a sheet form.

7. The film-forming material layer according to claim 6, wherein the layer has a thickness of 30 to 100 μm.

8. A transfer sheet comprising at least the film-forming material layer according to claim 6 laminated on a support film.

9. A dielectric layer comprising the film-forming material layer according to claim 6 sintered therein.

10. A method of producing a substrate having a dielectric layer formed thereon, comprising the step of transferring the film-forming material layer of the transfer sheet according to claim 8 onto a substrate and the step of sintering the transferred film-forming material layer at 550 to 650° C. to form a dielectric layer on the substrate.

11. A substrate having a dielectric layer formed thereon, which is produced according to the method of claim 10.

12. A dielectric inorganic powder-containing resin composition which is sinterable and comprises:
100 parts by weight of inorganic powder;
5 to 50 parts by weight of a binder resin; and
0.1 to 10 parts by weight of a phosphorus compound represented by formula (1):

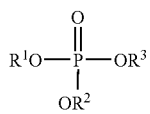

wherein $R^1$, $R^2$ and $R^3$ independently represent H, an alkyl group, an alkylaryl group or $-(CH_2CH_2O)_n-R^4$, wherein n is 1 to 15, and $R^4$ represents H, an alkyl group, an alkylaryl group or a (meth)acryloyl group, and
wherein the binder resin is a (meth)acrylic resin having a carboxyl group and has an acid valve of 0.5 to 5 KOH mg/g.

13. The inorganic powder-containing resin composition according to claim 12, wherein at least one of $R^1$, $R^2$ and $R^3$ is H.

14. The inorganic powder-containing resin composition according to claim 12, wherein the inorganic powder has a softening point of 400 to 650° C.

* * * * *